Jan. 5, 1965 — F. DELLON — 3,164,661
DISTANCE MEASURING SYSTEM BY IRRADIATING A TARGET WITH LIGHT AND SENSING THE REFLECTED LIGHT
Filed Aug. 22, 1961 — 2 Sheets-Sheet 1

FRANKLIN DELLON
INVENTOR.

BY S. A. Giarratana
George B. Oujevolk
ATTORNEYS

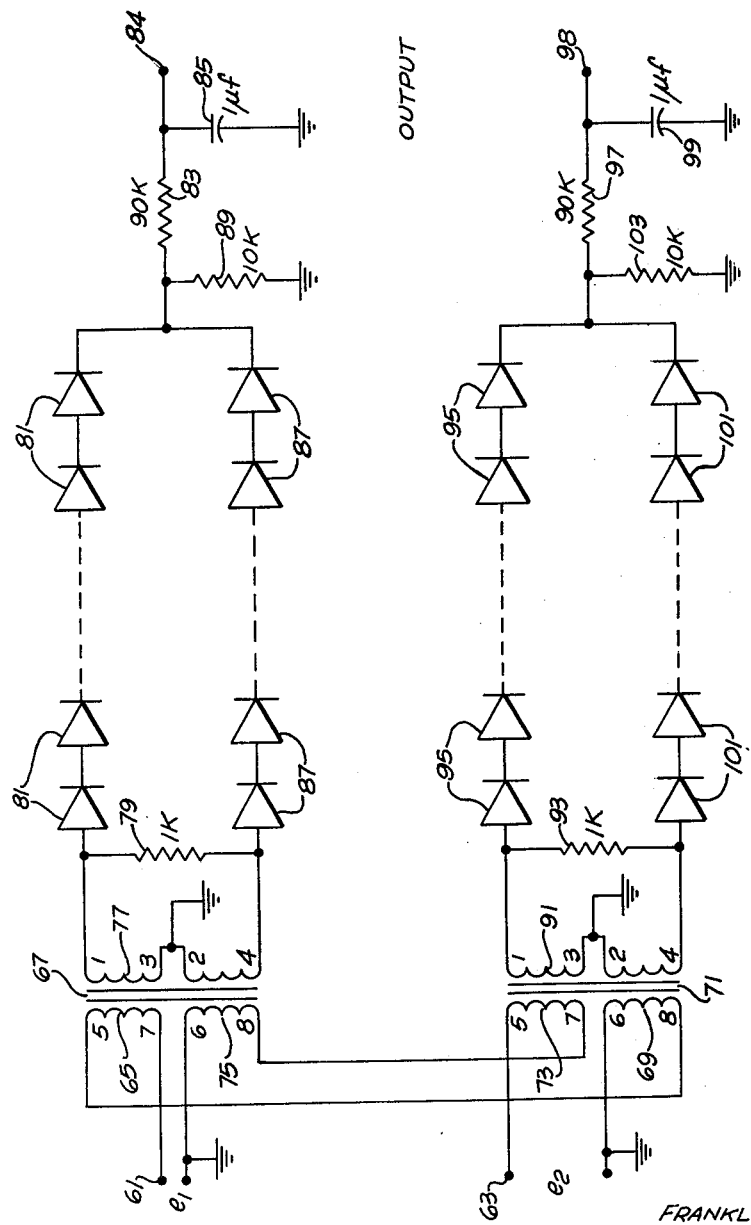

United States Patent Office 3,164,661
Patented Jan. 5, 1965

3,164,661
DISTANCE MEASURING SYSTEM BY IRRADIATING A TARGET WITH LIGHT AND SENSING THE REFLECTED LIGHT
Franklin Dellon, Bronx, N.Y., assignor to General Precision Inc., Little Falls, N.J., a corporation of Delaware
Filed Aug. 22, 1961, Ser. No. 133,175
2 Claims. (Cl. 88—1)

This invention relates to range finding systems, and more particularly to a range finding system which radiates intensity modulated light energy and which utilizes correlation techniques.

Prior to the present invention, range finding systems which detect targets by radiating ultraviolet light and infrared light were known. These systems of the prior art radiate light pulses and detect the resulting light pulses reflected from the target. The time between the sending of a light pulse and the detection of this light pulse after it has been reflected by a target provides an indication of the range of the target. In order to generate the light pulses, a light source is energized by periodic current pulses. The resulting rapid periodic energizing and de-energizing of the light source results in a short life for the light source.

The range of these systems of the prior art is limited by the signal to noise ratio. The present invention, by making use of correlation techniques, achieves a high signal to noise ratio and therefore has a much greater range than the systems of the prior art. According to the invention, the output signal from an audio oscillator is amplified and the amplified signal is used to energize a light source. Because an oscillating current energizes the light source, the light source radiates light which is intensity modulated about a quiescent level. The radiated light, after being reflected from the target, is detected by a detector cell, which translates the intensity of the reflected light into the amplitude of an electrical signal. This electrical signal will therefore be amplitude modulated precisely in accordance with the intensity modulation of the detected light. The phase of the detected light relative to the phase of the radiated light will be directly proportional to the range of the target. Therefore the phase of the amplitude modulation of the output signal of the detector cell relative to the phase of the output signal of the audio oscillator will be directly proportional to the range of the target. The output signal from the detector cell is amplified and applied to a correlator and the output signal from the oscillator is also applied to the correlator. The correlator provides an indication of the phase difference between the two signals and therefore an indication of the range of the target.

In the system of the invention, because the light source is continuously energized by an oscillatory signal instead of being energized by current pulses, the life of the source is greatly increased. The use of an audio oscillator to provide the oscillatory energization of the light source permits the use of xenon lamps, which have poor responses at high frequencies, to be used for the light source.

Accordingly, an object of the present invention is to provide an improved range finding system.

Another object of the invention is to provide an improved range finding system of the type which radiates light energy.

A further object of the invention is to provide a range finding system of the type described which has a greater range than the systems of the prior art.

A still further object of the invention is to increase the life of the light source in range finding systems of the type which detect targets by radiating light energy.

A still further object of the invention is to make use of correlation techniques in range finding systems of the type which detect targets by radiating light energy.

Further objects and advantages of the present invention will become readily apparent as the following detailed description of the invention unfolds and when taken in conjunction with the drawings, wherein:

FIG. 2 is a circuit diagram of a multiplier averager circuit used in the system of the invention.

Figure 1:
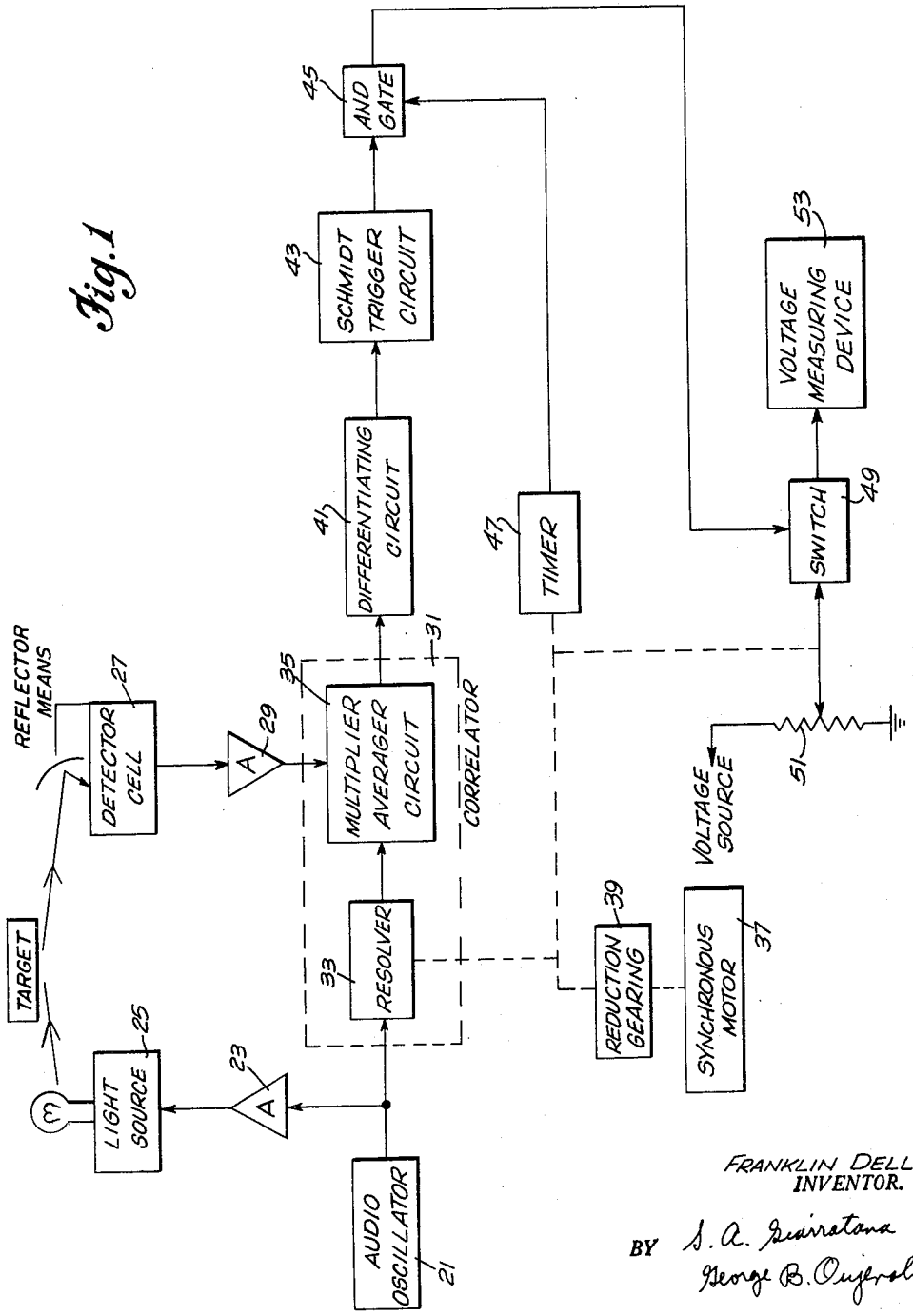
FIG. 1 is a block diagram illustrating the system of the invention.

As shown in FIG. 1, the system of the invention comprises an audio oscillator 21, the output signal of which is amplified by an amplifier 23. The amplified output signal of the amplifier 23 energizes a light source 25, which comprises xenon lamps. Because the light source 25 is energized by an oscillatory signal generated by the oscillator 21, it will radiate light which is intensity modulated corresponding precisely in frequency and phase with the output signal of the oscillator 21. The intensity modulation will be about a quiescent level. The light radiated by the light source 25 will irradiate a target and be reflected thereby. The reflected light is focused on a detector cell 27 by means of a parabolic reflector. Since the detected light originated from the light source 25, it will be intensity modulated with a frequency precisely corresponding with the frequency of the output signal of the oscillator 21 and the phase of the intensity modulation of the detected light will lag that of the output signal of the oscillator 21 by an amount equal to the time it takes the light to travel from the light source 25 to the target and back to the detector cell 27. The detector cell 27 translates the intensity of the detected light into the amplitude of an electrical signal, which therefore will be amplitude modulated to correspond precisely in frequency and phase with the intensity modulation of the detected light. Thus the phase difference between the output signal of the oscillator 21 and the output signal from the detector cell 27 will be proportional to the range of the target. The output signal of the detector cell 27 is amplified by an amplifier 29 and then fed to a correlator 31. The output signal from the audio oscillator 21 is also fed to the correlator 31, which is operated to measure the difference in phase between the two applied input signals and in this manner the range of the target is determined.

The correlator 31 determines the phase difference between the two applied signals by making use of cross correlation. The cross correlation of two functions can be expressed as follows:

$$\phi(\tau) = \lim_{T \to \infty} \frac{1}{2T} \int_{-T}^{+T} f_1(t-\tau) f_2(t) \, dt \qquad (1)$$

in which $\tau$ is a time delay and T is the correlation time. The intensity modulation of the light radiated by the light source 25 can be represented by the following function of time:

$$I_1(t) = A \sin \omega_0 t \qquad (2)$$

in which A is the magnitude of the modulation and $t$ is the variable, time. The intensity modulation of this light when it is detected by the detector cell 27, after it has been reflected by a target, if the effects of noise are not considered, can be represented by the following function:

$$I_2(t) = B \sin \omega_0 (t-D) \qquad (3)$$

in which D is the time it takes the light to travel from the light source 25 to the target and back to the detector cell 27 and B is the magnitude of the intensity modulation of the detected light. The cross correlation function of these two functions (2) and (3) can be expressed as follows:

$$\phi(\tau) = \lim_{t \to \infty} \frac{AB}{2T} \int_{-T}^{+T} \sin \omega_0(t-D) \sin \omega_0(t-\tau) \, dt \qquad (4)$$

Since the integrand of function (4) is periodic, the integrating and limiting steps can be replaced by an integration over one period and division by the period. Thus the following function results:

$$\phi(\tau) = \frac{AB\pi_0}{2\pi} \int_0^{\frac{2\pi}{\omega_0}} \sin(\omega_0 t - \omega_0 D) \sin(\omega_0 t - \omega_0 \tau) dt \quad (5)$$

If for purposes of simplicity $u$ is substituted for $\omega_0 t$, then the following function is obtained:

$$\phi(\tau) = \frac{AB}{2\pi} \int_0^{2\pi} \sin(u - \omega_0 D) \sin(u - \omega_0 \tau) du \quad (6)$$

When the integrand of function (6) is expanded, the following expression results:

$$\phi(\tau) = \frac{AB}{2\pi} \Biggl\{ \int_0^{2\pi} \sin^2 u \cos \omega_0 D \cos \omega_0 \tau\, du -$$

$$\int_0^{2\pi} [\sin u \cos u \sin \omega_0 (D+\tau) du] +$$

$$\int_0^{2\pi} \cos^2 u \sin \omega_0 D \sin \omega_0 \tau\, dt \Biggr\} \quad (7)$$

This expression can be simplified by taking into consideration the following equalities:

$$\int_0^{2\pi} \sin^2 u\, du = \int_0^{2\pi} \cos^2 u\, du = \pi \quad (8)$$

and $$\int_0^{2\pi} \sin u \cos u\, du = 0 \quad (9)$$

When function (7) is simplified by means of these equalities, the following functions result:

$$\phi(\tau) = \frac{AB}{2} (\cos \omega_0 D \cos \omega_0 \tau + \sin \omega_0 D \sin \omega_0 \tau) \quad (10)$$

and $$\phi(\tau) = \frac{AB}{2} \cos \omega_0 (\tau - D) \quad (11)$$

From function (11) it will be observed that the absolute value of $\phi(\tau)$ is maximized when $\tau$ is such a value that $\omega_0(\tau - D) = 0$ or when $\tau = D$. Thus the cross correlation function is maximized when the time delay $\tau$ is equal to the travel time of the light $D$. It is on this relationship that the operation of the ranging system of the present invention is based.

The correlator 31 is in fact an analog computer which computes for a selected value of $\tau$ the correlation function (4) of the two signals applied respectively from the oscillator 21 and the amplifier 29, which signals represent the functions (2) and (3), $A \sin \omega_0 t$ and $B \sin \omega_0(t-D)$, respectively. It will be noted from function (4) for $\phi(\tau)$ that the function (3), $B \sin \omega_0(t-D)$, is multiplied by the function $A \sin \omega_0(t-\tau)$. This latter function can be obtained by delaying the function (2), $A \sin \omega_0 t$, by the amount equal to $\tau$. Since the function (2) is sinusoidal the delay can be achieved by a phase shifter. Therefore the output signal from the oscillator 21 representing the function (2) is applied to a resolver 33 in the correlator 31. The resolver 33 comprises a device which shifts the phase of an applied input signal. The phase shift provided is continuously variable and is proportional to the angular position of an input shaft. If the resolver 33 retards the phase of the applied signal by an amount equal to the interval $\tau$ then the output signal from the resolver 33 will represent the function $A \sin \omega_0(t-\tau)$. In the correlator 31 the output signals from the resolver 33 and the amplifier 29 are applied to the inputs of a multiplier averager circuit 35 which multiplies and averages the two applied input signals. The resulting output signal from the multiplier averager circuit 35 will represent the value of the function (4) for $\phi(\tau)$ for the particular phase shift $\tau$ provided by the resolver 33 because the multiplication operation performed by the circuit 35 will provide the function in the integrand of the function (4) and the averaging operation performed by the circuit 35 will approximate the integration of the two multiplied functions. The integration cannot, of course, be performed in an analog circuit over an infinite time interval but the integration can be approximated. The averaging operation performed in the circuit 35 provides a good approximation of the integration. As a result of the approximation there will be a small fluctuation in the output signal from the circuit 35.

If the angular position of the input shaft of the resolver 33 is adjusted until the output signal from the multiplier average circuit 35 reaches a maximum, the phase shift $\tau$ provided by the resolver 33 will be equal to the interval $D$ which is the length of time for the light to travel from the light source 25 to the target and back to the detector cell 27. Thus from the phase shift provided by the resolver 33 when the output signal of the multiplier averager circuit 35 is maximum, the range of the target can be determined. Thus the range of the target can be determined from the input shaft position of the resolver 33 when the output signal from the multiplier averager circuit 35 is a maximum.

The input shaft of the resolver 33 is continuously rotated at a constant speed by means of a synchronous motor 37, which drives the input shaft of the resolver through reduction gearing 39. Because the input shaft of the resolver 33 is driven at a constant speed, the phase shift $\tau$ provided thereby will be continuously varied over its entire range and the output signal from the multiplier averager circuit 35 will continuously vary as the value of $\tau$ varies. The output signal from the multiplier averager circuit 35 is differentiated by a differentiating circuit 41. As the input shaft of the resolver 33 is continuously rotated, the output signal from the multiplier averager circuit 35 will pass through a maximum when the value of the phase shift $\tau$ equals the time interval $D$ that it takes the radiated light to travel from the light source 25 to the target and from the target back to the detector cell 27. When the output signal from the multiplier averager circuit 35 passes through its maximum as the input shaft of the resolver 33 is continuously rotated, the output signal from the differentiating circuit 41 will pass through zero. Thus the output signal from the differentiating circuit 41 will pass through zero when the value of the phase shift $\tau$ provided by the resolver 33 equals the time interval $D$. The output signal from the differentiating circuit 41 is applied to a Schmidt trigger circuit 43, which is biased to be triggered when an input signal applied thereto reaches zero. When the Schmidt trigger circuit 43 is triggered, it will apply an output pulse to an AND gate 45. Thus the Schmidt trigger circuit 43 will apply a pulse to the AND gate 45 when the value of the phase shift $\tau$ provided by the resolver 33 becomes equal to the time interval D. The reduction gearing 39 also drives a timer 47 which is adapted to enable the AND gate 45 only in the first and second quadrants of the phase shift provided by the resolver 33; that is, the timer 47 enables the AND gate 45 only during the time that the input shaft of the resolver 33 is being driven through those angular positions in which the phase shift provided by the resolver 33 is between 0 and 180° The AND gate will not be enabled when the phase shift provided by the resolver is between 180° and 360°. The timer 47 controls the AND gate 45 in this manner to prevent ambiguity in the output from the Schmidt trigger circuit 43. The output from the AND gate 45 is applied to an electronic switch 49. When a pulse generated by the Schmidt trigger circuit 43 passes through the AND gate 45 and is applied to the switch 49, the switch 49 is actuated and connects the movable tap of a potentiometer 51 to a voltage measuring device 53. One side of the potentiometer 51 is grounded and the other side of the potentiometer 51 is connected to a source of constant voltage. Thus, when the Schmidt trigger circuit 43 generates an output pulse which passes through the AND gate 45 and is applied to the switch 49, the voltage on the movable tap of the potentiometer 51 is measured by the voltage measuring device 53, which provides an indication of the voltage. The reduction gearing 39 is also connected to drive the movable tap of the potentiometer 51. In the potentiometer 51, the position of the movable tap is controlled by the angular position of an input shaft. The potentiometer is constructed in such a manner to permit continuous rotation of the input shaft in one direction so that when the input shaft moves the movable tap to one end of the resistance of the potentiometer, continued angular rotation of the input shaft in the same direction will cause the movable tap to move immediately to the opposite end of the resistance of the potentiometer. The position of the movable tap 51 is made to correspond precisely with the angular position of the input shaft of the resolver 33 so that the output voltage from the potentiometer 51 will be proportional to the phase shift provided by the resolver 33. When the input shaft of the resolver 33 is driven through the angular position in which the phase shift provided by the resolver 33 equals the time it takes the light radiated from the source 25 to travel from the source 25 to the target and back to the detector cell 27, the Schmidt trigger circuit 43 will produce an output pulse which will pass through the AND gate 45 and actuate the electronic switch 49, whereupon the voltage of the movable tap of the potentiometer 51 will be measured by the voltage measuring device 53. This voltage measured by the voltage measuring device 53 will be directly proportional to the range of the target. The voltage measuring device 53 is calibrated to give the range of the target directly.

There are many different circuits which could be used for the multiplier averager circuit 35. For example, a pentode can be made to multiply the signal applied to its control grid with the signal applied to its suppressor grid. The present invention, however, makes use of the special circuit shown in FIG. 2 to provide the multiplier averager circuit 35 because the pentodes when used as multipliers suffer from instability. The theory of the circuit shown in FIG. 2 is based on the fact that the product AB of two numbers A and B may be written as the following expression:

$$AB = \frac{(A+B)^2}{4} - \frac{(A-B)^2}{4} \qquad (12)$$

In the circuit shown in FIG. 2, the input signal from the amplifier 29 is applied to terminal 61 and the input signal from the resolver 33 is applied to terminal 63. An input winding 65 of a transformer 67 and an input winding 69 of a transformer 71 are connected in series between the terminal 61 and ground. An input winding 73 of the transformer 71 and an input winding 75 of the transformer 67 are connected in series between the terminal 63 and ground. The windings 65 and 75 on the transformer 67 are wound so that the signals from the amplifier 29 and resolver 33 are added together in the transformer 67 and the windings 69 and 73 on transformer 71 are wound so that these signals are subtracted in transformer 71. The transformer 67 has a center tapped output winding 77, the center tap of which is grounded. The output signal produced in this center tapped output winding 77 will be the sum of the output signals from the resolver 33 and the amplifier 29. A one kilohm resistor 79 is connected across the winding 77. One terminal of the winding 77 is connected through a plurality of series connected semiconductor diodes 81 and a ninety kilohm resistor 83, connected in series with the diodes 81, to an output terminal 84. A one microfarad capacitor 85 is connected between the terminal 84 and ground. The other terminal of the winding 77 is connected through a plurality of series connected semiconductor diodes 87 to the junction between the diodes 81 and the resistor 83. The diodes 81 and the diodes 87 are poled to present a low impedance to current flowing from the winding 77 to the terminal 84. A ten kilohm resistor 89 is connected from the junction between the resistor 83 and the diodes 81 and 87 to ground. At low voltages the output signal from a semiconductor diode provides a good approximation of being proportional to the square of the R.M.S. value of an applied input oscillatory signal. Therefore, the output signal generated across the capacitor 85 will be proportional to the average of the square of the signal produced in the winding 77.

The transformer 71 has a center tapped output winding 91, the center tap of which is connected to ground. A one kilohm resistor 93 is connected across the winding 91. One terminal of the winding 91 is connected through a plurality of series connected semiconductor diodes 95 and a 90 kilohm resistor 97, connected in series with the diodes 95 to an output terminal 98. A one microfarad capacitor 99 is connected between the terminal 98 and ground. The other terminal of the winding 91 is connected through a plurality of series connected semiconductor diodes 101 to the junction between the resistor 97 and the diodes 95. The diodes 95 and the diodes 101 are poled to present a low impedance to current flowing from the winding 91 to the terminal 98. A ten kilohm resistor 103 connects the junction between the resistor 97 and the diodes 95 and 101 to ground. Thus the voltage produced across the capacitor 99 will be proportional to the average of a square of the voltage generated in the winding 91. The voltage produced across the terminals 84 and 98 will be the difference between the voltages produced across the capacitors 85 and 99. Therefore the voltage produced across the output terminals 84 and 98 will be proportional to the average of the difference between the square of the signal produced in winding 77 and the square of the signal produced in winding 91. The output signal produced across terminals 84 and 98 will thus be proportional to the average of the square of the sum of the signals applied to terminals 61 and 63 minus the square of the difference between these two signals. Therefore the voltage produced across terminals 84 and 98 will be proportional to the average of the product of the two signals applied to terminals 61 and 63. Since averaging produces a good approximation of the integral of a signal, the output voltage produced across terminals 84 and 98 will be proportional to the integral of the product of the signals applied to terminals 61 and 63. Therefore the voltage across terminals 84 and 98 will be approximately proportional to the value of function (4) for $\phi(\tau)$ when $\tau$ equals the phase shift introduced by the resolver 33.

In this circuit a plurality of series connected semiconductor diodes are connected to the terminals of the windings 77 and 91 in order to maintain the voltage across each semiconductor diode at a low level without making the input signals too small. As pointed out above, the voltages across the semiconductor diodes should be kept at a low level so that they have the characteristic of providing an output signal proportional to the square of the R.M.S. of the applied input signal. With this multiplier averager circuit, the output voltage is only approximately proportional to the integral of the product of the two input voltages, but the point at which the output voltage across the terminals 84 and 98 becomes a maximum is precisely when the phase shift provided by the resolver 33 equals the time it takes the light to travel from the source 25 to the target and back to the detector cell 27.

Instead of using the circuit shown in FIG. 2, other circuits may be employed of a similar design making use of components which provide a square output of the R.M.S. input. For example, a circuit using triodes could be used since triodes have this characteristic. The principles of the invention are applicable to range finding systems which radiate infrared light, ultraviolet light and visible light, and the term "light" is used generically to cover this entire spectrum. The above described system provides an indication of the range of the target automatically, but the system could be operated by manually adjusting the input shaft of the resolver until the output signal of the multiplier averager circuit reaches a maximum and then observing the shaft angle position for this condition. The angular position of the input shaft could be calibrated to directly give the range of the target. Many modifications may be made to the above described specific embodiment of the invention without departing from the spirit and scope thereof.

What is claimed is:

1. A distance measuring system, comprising in combination,
   - a light source for irradiating a target and be reflected thereby;
   - an audio oscillator to modulate said light source so as to produce a light signal modulated in phase, frequency and amplitude;
   - detector cell means with reflector means for focussing said reflected light thereon, said detector cell means translating said detected light into an amplitude modulated electric signal whose amplitude and frequency correspond to that of both the light source and the detected signal but whose phase corresponds only to the detected signal;
   - resolver means connected to said audio oscillator, receiving a signal therefrom, corresponding in amplitude to that supplied by said detector cell and shifting the phase of said signal through 360° by the rotation thereof, including motor means to rotate said resolver means;
   - a multiplier averager circuit to which is applied the output from the detector cell means and resolver means, and multiplying said two inputs;
   - trigger means responsive to said multiplier averager circuit, said trigger means being enabled only when said multiplied product is at its maximum;
   - AND gate means, one input of which is responsive to said trigger means;
   - timer means connected between said resolver motor means, and the other input to said AND gate means, supplying an output to enable said AND gate means only through those angle positions in which the phase shift provided by a resolver is between 0° and 180°;
   - potentiometer means, said potentiometer means being likewise rotated by resolver motor means including a line for connection to a voltage source;
   - voltage measuring means responsive to the voltage from a voltage source across said potentiometer measuring means; and
   - switch means enabled by said AND gate means between said potentiometer means and said voltage measuring means so that the information provided by said voltage measuring means corresponds to the distance between said light source and said target.

2. A distance measuring system as claimed in claim 1, said multiplier averager circuit including, means to add and means to subtract the two inputs thereto; squaring means to square said added and subtracted results, means to subtract said squared subtracted result from said squared added result to provide an output, and means to divide said output by four.

References Cited by the Examiner

UNITED STATES PATENTS

| | | |
|---|---|---|
| 2,665,420 | 1/54 | Winterhalter. |
| 2,918,581 | 12/59 | Willey et al. _____ 88—1 |
| 2,966,090 | 12/60 | Scholdstrom _____ 88—1 |

OTHER REFERENCES

Horton: "Noise-Modulated Distance Measuring Systems," Proc. of the IRE, vol. 47, No. 5, May 1959, pp. 821 to 828.

JEWELL H. PEDERSEN, *Primary Examiner.*

EMIL G. ANDERSON, *Examiner.*